┌─────────────────────────────────────────────┬─────────────────────────────┐

United States Patent Office 3,468,853
Patented Sept. 23, 1969

---

3,468,853
PROCESS OF POLYMERIZING A GLYCOLIDE
Edward Emil Schmitt, Norwalk, Conn., and Rocco Albert Polistina, Port Chester, N.Y., assignors to American Cyanamid Company, Stamford, Conn., a corporation of Maine
No Drawing. Filed June 15, 1966, Ser. No. 557,607
Int. Cl. C08g *17/017, 17/02*
U.S. Cl. 260—78.3                                8 Claims

---

ABSTRACT OF THE DISCLOSURE

This invention relates to a process for polymerizing a glycolide composition and spinning fibers from the polymer thus produced in which the polymerization is carried out in the presence of certain quantities of certain alcohols and certain quantities of a polymerization catalyst within a particular temperature range until a substantially equilibrium viscosity is reached and thereafter spinning the polymer from the melt state while still having a substantially equilibrium viscosity and prior to incipient crystallization.

---

This invention relates to a process for polymerizing a glycolide and spinning fibers from the polymer thus produced comprising heating a mixture of (1) a substantially pure glycolide composition, (2) from about 0.05 to 1.5 mole percent based on the moles of said glycolide composition of an alcohol free of non-benzenoid unsaturation and free of any reactive group other than an alcoholic hydroxy group, and (3) from about 0.0005% to about 0.0025%, by weight, based on the weight of said glycolide composition of a polymerization catalyst for said glycolide composition, at a temperature varying between about 205° C. and 235° C. until a substantially equilibrium viscosity is reached and thereafter spinning said polyglycolic acid from the melt state while still having a substantially equilibrium viscosity and prior to the incipient crystallization. Still further, this invention relates to a process which permits the production of a polymer and ultimately a filament of polyglycolic acid having a selective and substantially constant high molecular weight.

One of the objects of the present invention is to polymerize a glycolide and to spin fibers from the polymer melt thus produced by heating a mixture of a substantially pure glycolide and selected small mole percentages of certain alcoholic compounds in the presence of a polymerization catalyst for the glycolide at controlled temperatures until a substantially equilibrium viscosity is achieved and thereafter spinning the polyglycolic acid from the melt state while still maintaining a substantially equilibrium viscosity and prior to the incipient crystallization.

A further object of the present invention is to polymerize a glycolide composition and to spin fibers and/or filaments from the polymer thus produced in such a manner as to control selectively the molecular weight of the polymeric material in the spun fiber.

A further object of the present invention is to produce a fibrous material which will be particularly useful as a synthetic absorbable suture.

These and other objects of the present invention will be discussed in greater detail hereinbelow.

We have found that the normal crystalline melting point of polyglycolide (polyglycolic acid) is about 230–232° C., although others have reported it to fall between about 224° C. and 235° C. It should be noted that the temperature range used in the process of the present invention for polymerizing the glycolide and spinning the polyglycolide falls at least in part below the normal crystalline melting point of the polymer. However, at the temperatures used in the process of the present invention, the polyglycolide will not reach its crystalline state for a prolonged period of time. We have further observed that once the polymer has reached the crystalline state, it is virtually impossible to cool the polymer melt to a temperature much below 235° C. and maintain it in the molten state unless the temperature is raised to about 245° C., or higher, prior to the cooling process. At these higher temperatures, degradative occurrences in the polymeric material forced us to search for a method of polymerizing the substantially pure glycolide composition and spinning polyglycolic acid therefrom at these lower temperatures. We were armed with the following facts:

If the polymer of the glycolide composition is prepared at any temperature between about 200–250° C. and then allowed to cool and crystallize, the crystalline mass may be melted at 230–232° C., or higher.

If the temperature of the remelt is raised to 245° C. to destroy the crystallization memory, the melt cannot be maintained at this temperature without thermal degradation of the polymer and subsequent loss of molecular weight. The polymer can be readily spun at these temperatures, but the resultant molecular weight is always reduced and is variable with regard to molecular weight.

If the temperature of the remelt is not raised above 232° C., the polymer can be maintained in the melt for a longer period of time without serious thermal degradation or threat of incipient crystallization. However, it is difficult to spin a fiber from such a melt since the polymer spontaneously crystallizes as soon as the temperature falls below the melting point. Thus, further processing of the fiber is virtually impossible.

If the temperature of the remelt is quickly raised to 245° C. and then quickly lowered to between 205 and 230° C., two purposes are accomplished. The crystallizing memory is destroyed, yet the thermal energy required to keep it at these supercooled temperatures does not thermally abuse the polymer molecules. The polymer can be spun readily in the amorphous state to a strong orientable fiber. Unfortunately, the polymer remelt can only be maintained in this state for a maximum of about an hour or two which frequently is not long enough to accomplish the spinning operation.

If polyglycolic acid is prepared close to or below its potential crystalline melting point, i.e., 205° to 235° C., in keeping with the process conditions of the present invention, a meta stable state is achieved directly which corresponds to the supercooled state obtained by the method immediately hereinabove. Since that method leaves something to be desired, based on the aforementioned thermal instability, and relatively short supercooled state maintenance time, the preferred method is the attainment of this "supercooled" state by the direct synthesis of the "supercooled melt" at about or below the potential melting point of the crystalline polymer.

The fibers produced according to the process of the present invention may be varied over a broad range of molecular weights and, hence, over a broad range of melt viscosities. Selected fibres chosen within this range display differences in certain of their physical properties which probably include differences in the rate of absorption in the animal body of a suture made from this material. Depending on the properties desired in the ultimate fiber, it is important and necessary that the melt viscosity be controlled within selectively narrow ranges. It is, furthermore, necessary in the practice of the process of the present invention that the process be continued, during the polymerization step, until a substantially equilibrium viscosity is reached. Thereafter, the spinning of the fiber or filament from the polyglycolic acid in the melt state is begun and continued as long as the polymeric material continues to maintain its substantially equilibrium viscosity and prior to the incipient crystallization. The ultimate viscosity of the polymerizing system may be controlled to within a few hundred poises over the useful fiber viscosity range of from about 200 to about 100,000 poises by the addition of the proper amount of an alcohol within the rather narrow limits of 0.05 and 1.50 mole percent based on the moles of glycolide in the reaction mixture which also contains from about 0.0005% to about 0.0025%, by weight, of a polymerization catalyst.

By way of example, if it is desired to produce a polymer which possesses a melt viscosity of about 2000± 200 poises, the amount of lauryl alcohol or other monofunctional alcohol that is added is about 0.69 mole percent. The viscosity measurement would, of course, be determined at that melt temperature while the polymer is in a substantially equilibrium viscosity.

The glycolide composition of the present invention is a substantially pure composition that consists essentially of $\alpha$-glycolide and/or $\beta$-glycolide. The $\alpha$-glycolide and its method of preparation are fully described in the copending application having the United States Ser. No. 484,110, filed Aug. 31, 1965, now abandoned. The $\beta$-glycolide and its method of preparation are similarly fully disclosed in the United States application Ser. No. 484,111, also filed on Aug. 31, 1965, now abandoned. These applications are incorporated herein by reference.

A continuation-in-part application of said $\alpha$-glycolide case having the Ser. No. 484,110 has now been filed and has the Ser. No. 645,502, filed June 12, 1967. Furthermore, a continuation-in-part application of said $\beta$-glycolide case having the Ser. No. 484,111 has now been filed and has the Ser. No. 662,309, filed Aug. 22, 1967.

The $\alpha$-glycolide material is prepared from a mixture of $\alpha$- and $\beta$-glycolide isomers. This mixture of isomers is prepared in the following manner: 400 parts of commercial glycolic acid is introduced into a suitable reaction vessel which is heated to 170–180° C. at atmospheric pressure to distill off the water. The pressure is then slowly reduced to the equivalent of 5 mm. of Hg, maintained at the temperature indicated until water ceases to distill. The resultant mixture is allowed to cool, recovered, and ground into powder. About 280 parts of the latter are slowly added to a flask purged with nitrogen and held at a pressure below the equivalent of 15 mm. of Hg, and at a temperature from about 250–285° C. 250 parts of the resultant distillates are next dissolved in approximately twice its weight of ethyl acetate at the boiling point; decolorizing charcoal is added; and reflux contined for ½ hour. The solution is filtered while hot; cooled; and white glycolide crystals are obtained on filtering and drying. The recrystallization is repeated twice in like manner except that the decolorizing charcoal is omitted. There is obtained 160 parts of an isomeric mixture of glycolides having a melting point of 83.8–84.3° C.

The product is characterized by distinctive infrared spectral bands at the following wavelengths: 1795, 1772, 1765, 1750, 1455, 1402, 1210, and 1080 cm.$^{-1}$. Elemental analyses and molecular determination are consistent with a chemically pure glycolide. No consistent values for refractive indices, crystal habit, or optic axial angle are obtained.

100 parts of the mixture of the glycolides as prepared above are placed in 1650 parts (by volume) of isopropyl alcohol at a temperature of 80° C. The hot solution is filtered through activated charcoal. While cooling to about 42° C., white crystals precipitate out of solution. The crystals are filtered and washed with ether to yield 50 parts of $\alpha$-glycolide which possesses an infrared spectrum as follows: doublet carbonyl bands at 1772 and 1750 cm.$^{-1}$ and another distinctive band at 1402 cm.$^{-1}$ and the absence of bands at 1455 cm.$^{-1}$ and between 1240 and 1060 cm.$^{-1}$. The crystals are obtained in thin flakes in the orthorhombic system. The crystals have the following refractive indices (relative to Na D-line at 25° C.):

$\alpha = 1.486$
$\beta = 1.506$
$\gamma = 1.620$

The crystals have an optic axial angle $2V = +47°40'$. A molecular weight determination in acetonitrile affords an actual value of 115 as compared with a theoretical value of 116. Upon an elemental carbon and hydrogen analysis, the following in percentages are recorded:

Calculated for $C_4H_4O_4$: C, 41.39; H, 3.47. Found: C, 41.42; H, 3.55.

The $\beta$-glycolide isomer is prepared by taking 100 parts of the mixture of the $\alpha$- and $\beta$-glycolides as prepared hereinabove and are placed into a suitable reactor with 450 parts by volume of cyclohexanone. The mixture is heated to about 80° C. to achieve solution. The solution is then slowly cooled with stirring to a temperature below 32° C. without the formation of precipitate. Continued cooling to 0° C. results in the formation of 35 parts of precipitate which is collected and dried. Cooling of the filtrate to −40° C. results in an additional 28 parts of precipitate. The combined precipitate is in the form of massive particles in the monoclinic crystal system. The product has the following distinctive infrared spectral bands: doublet carbonyl bands at 1795 and 1765 cm.$^{-1}$, additional distincitive bands at 1455, 1210, and 1080 cm.$^{-1}$, and the absence of a band at 1402 cm.$^{-1}$, since the latter is characteristic of the $\alpha$-glycolide isomer. The crystals have the following refractive indices (relative to Na D-line at 25° C.):

$N\alpha = 1.430$
$N\beta = 1.552$
$N\gamma = 1.568$

The crystals have an optic axial angle $2V = -37°20'$. A molecular weight determination in acetonitrile affords an actual value of 110 as compared with a theoretical value of 116. Upon an elemental carbon and hydrogen analysis, the following in percentages are recorded:

Calculated for $C_4H_4O_4$: C, 41.39; H, 3.47. Found: C, 41.24; H, 3.50.

It is within the contemplation of the present invention to utilize the $\alpha$-glycolide alone or the $\beta$-glycolide alone, or mixtures of the $\alpha$- and $\beta$-glycolide as the substantially sole components of the substantially pure glycolide composition. Even when the $\alpha$-glycolide alone is used in the practice of the process of the present invention, there is the possibility and likelihood, under the conditions of the process, that at least some of the $\alpha$-glycolide is converted to the $\beta$-glycolide during the polymerization. Collaterally, when the $\beta$-glycolide is used as the sole component in the glycolide composition of the present invention, there is the possibility that at least some of the $\beta$-glycolide will become converted to the $\alpha$-glycolide during the course of the polymerization. The glycolide composition used in the present invention can be derived by first reacting glycolic acid with itself so as to form a ring structure generally identified as glycolide. In the preparation of the glycolide per se, impurities of unknown identity are produced by side reactions. These side reaction products need to be removed from the composition before the process of the present invention is undertaken. There are a plurality of different processes by which the impurities may be removed, and it is deemed sufficient to indicate that one of the methods for purifying the glycolide material is by recrystallization as will be indicated hereinbelow.

In carrying out the process of the present invention, it is necessary in order to control the molecular weight during the polymerization to make use of very limited amounts of a polymerization initiator which is also referred to as a polymerization accelerator and/or as a polymerization controller of molecular weight. In some respects, it is believed that these initators function as a chain terminator. These initiators are any one of a number of alcohols which are free of non-benzenoid unsaturation and are also free of reactive groups other than alcoholic hydroxy groups. Included in the group of alcoholic compounds are the monohydric and polyhydric aliphatic alcohols as well as the monohydric and polyhydric aromatic alcohols. Excluded from the group of alcohols are those alcohols which contain polymerizably reactive double bonds which would tend to interfere with the molecular weight control to which the process of the present invention is directed in part. Excluded are those alcohols represented by the species allyl alcohol and methallyl alcohol. Also excluded from the group of alcoholic compounds are those which contain reactive groups other than alcoholic hydroxy groups such as carboxyl groups, amino groups, and the like. The purpose for excluding these compounds having these other reactive groups is because they too may enter into reaction during the polymerization process and thereby diminish the control which the present process provides over the molecular weight range. The amount of the compound containing the alcoholic hydroxy group or groups which is used in the process of the present invention may be varied between about 0.05 to 1.5 mole percent, based on the total moles of the substantially pure glycolide composition and, preferably, between 0.2 to 0.8 mole percent when mono-alcohols are used, 0.13 to 0.6 mole percent when di-alcohols are used, 0.08 to 0.4 mole percent when tri-alcohols are used, 0.05 to 0.2 mole percent when tetra-alcohols and higher alcohols are used.

Among the alcohols which may be used in the amounts stated hereinabove in the practice of the process of the present invention are methyl alcohol, ethyl alcohol, propyl alcohols, butyl alcohols, amyl alcohols, hexyl alcohols, heptyl alcohols, octyl alcohols, nonyl alcohols, decyl alcohols, undecyl alcohols, and, particularly, lauryl alcohol, dodecyl alcohol, tridecyl alcohols and stearyl alcohols or aromatic alcohols such as benzyl alcohol, and the like. It is to be noted that each of the species recited hereinabove are monohydric alcohols. However, the polyhydric alcohols, including the dihydric alcohols, may also be used in the amounts set forth hereinabove. Included in this latter group are such polyhydric alcohols as ethylene glycol, propylene glycol, butanediol-1,4-diethylene glycol, dipropylene glycol, glycerol, pentaerythritol, dipentaerythritol, adonitol, mannitol, trimethylol propane, trimethylol ethane, sorbitol, trimethylene glycol, tetramethylene glycol, pinacol, arabitol, benzyl alcohol, xylitol, and the like.

In the practice of the process of the present invention, one can operate at atmospheric pressure, subatmospheric pressure or superatmospheric pressure. When comparatively low boiling alcohols are used such as methanol and ethanol, for example, it may be necessary to utilize superatmospheric pressure since the reaction temperature will be signifiacntly above the boiling point of these lower aliphatic alcohols and it may, therefore, be necessary to operate at increased pressure in a closed system in order to maintain the alcohol in contact with the substantially pure glycolide composition in order that it can function, in turn, as a polymerization initiator, a polymerization accelerator and a polymerization controller. Of all of the alcohols which may be used in the practice of the present invention, it is preferred to use the saturated aliphatic monohydric alcohols which have between 6 and 14 carbon atoms, inclusive. We have found that we realize the best results by utilizing lauryl alcohol in the amounts stated hereinabove. If desired, one may make use of a plurality of these alcohols in admixture with one another and if such a mixture of alcohols is used, the total amount of the mixture of the alcohols must fall within the amounts of mole percentages based on the total moles of said glycolide composition set forth hereinabove.

In the practice of the polymerization step of the present invention, a polymerization catalyst is used in exceedingly small amounts, namely, between, between about 0.0005% and 0.0025%, by weight, based on the total weight of the substantially pure glycolide composition of a polymerization catalyst for said glycolide composition of which a substantial plurality are known. It is preferred to use about 0.00125%, by weight, of the polymerization catalyst, same basis. Among the polymerization catalyst which may be used are the stannous salts such as $SnCl_2 \cdot 2H_2O$, stannous acetate, stannous fluoride, dibutyl stannic dilaurate, stannous stearate, stannic oxide, stannous oxide, stannic tetrachloride, and the like. Other polymerization catalysts included are antimony trifluoride, bismuth nitrate dihydrate, tetraphenyl tin, antimony trioxide, lead oxide, lead stearate, titanium tetrachloride, tetraisopropyl titanate, boron trifluoride, triethoxy aluminum, diethyl aluminum chloride, triethyl amine, tributyl amine, tetraethylammonium bromide, tributyl phosphine, tributyl stibiene, tributyl arsine, and the like.

In the practice of the process of the present invention, the polymerization of the glycolide composition is carried out at a temperature varying between about 205° C. and 235° C. until a substantially equilibrium viscosity is reached and thereafter spinning said polyglycolic acid from the melt state while still having a substantially equilibrium viscosity and prior to the incipient crystallization. It is preferred to carry out the process of the present invention at a temperature of about 215° C. and 230° C. For optimum results, a temperature between about 222° C. and 228° C. should be used.

In producing the filaments according to the process of the present invention, it is desired that such filaments will have the ultimate properties desired in a synthetic absorbable suture material such as initial tensile strength, knot strength, knottability, good handleability and being capable of retaining a high proportion of its tensile strength for at least three and, preferably, for as long as fifteen days when embedded in living muscular tissue, and yet being capable of being substantially completely absorbed in ninety days when embedded in living muscular tissue.

Absorbable sutures in current use by the medical profession and veterinary profession for use in humans and lower animals are made from animal tissues, primarily of collagen. The sutures meeting with the greatest acceptance are generally formed by splitting animal intestines, separating the serosa layer, then twisting and chromacizing. Because of the nature of the tissues being used and natural biological variation, difficulty is sometimes encountered in getting uniformity of size, texture, strength and absorption rate. Any material of biologic origin may have antigenic characteristics that in at least some instances cause undesirable complications. Necessarily, the sutures from natural origin are short segments usually about five feet long. An absorbable synthetic suture and its method of preparation is shown in the copending application having the Ser. No. 320,543, filed Oct. 31, 1963 in the names of Edward Emil Schmitt and Rocco Albert Polistina, entitled "Surgical Sutures," which application is incorporated herein by reference. These surgical sutures have good knottability, good knot strength, good handleability and ready colorability and can be prepared in deniers of from about 1 to about 4,000. These sutures retain a high proportion of their original strength for at least three days when embedded in living muscular tissue. On the other hand, these sutures are substantially completely absorbed in 90 days or less when embedded in living muscular tissue and are substantially free from contaminates not absorbable by living muscular tissues.

The process for preparing the polyglycolic acid is a well-known process in the art as is shown in the U.S. Patent 2,668,162, Lowe, "Preparation of High Molecular Polyhydroxy Acetic Ester," and the U.S. Patent 2,676,945, Higgins, "Condensation Polymers of Hydroxy-Acetic Acid." Each of these patents are incorporated herein by reference.

When the polyglycolic acid has been polymerized to a substantially equilibrium viscosity, the spinning is then begun in order to convert the polyglycolic acid from the melt state into a filament by melt spinning techniques.

The filament is formed as it is extruded through the orifice in a spinnerette and cooled to ambient temperature. Immediately after emerging from the orifice in the spinnerette, the filament is quenched by passing it through a water bath or any other suitable cooling or heat transfer medium so as to reduce the temperture from above 200° C. to about 25° C. The strength enhancement and orientation of the polymer molecules in the filament may be accomplished later. In order to orient the polymer molecules in the filament, it is drawn to about 5 times it original length to produce an initially strong, tough fiber. It is practical to collect the stretched and oriented filament onto a spool.

In order that the concept of the present invention may be more fully understood, the following examples are set forth in which all parts are parts by weight unless otherwise indicated. These examples are set forth primarily for the purpose of illustration and any specific enumeration of detail contained therein should not be construed as a limitation on the case except as is indicated in the appended claims. In setting forth these examples, a broad description of the manipulative steps and amounts are generically stated, and then are specifically recited in the accompanying table.

EXAMPLE 1

Into a suitable reaction vessel, there is charged 50 parts of a substantially pure glycolide composition, a selected amount of a 1% ether solution of a catalyst and a selected amount of an alcohol. The vessel is evacuated and purged with argon. The reaction vessel is placed in a vertical position in a closed glass chamber throughout which diethylene glycol is refluxed at the selected temperature and pressure in order to accurately control the temperature of the polymerizing mixture. The boiling point of the diethylene glycol is controlled by regulating the pressure on the system. At periodic intervals after melting, the viscosity of the reaction mixture is measured and when a substantially equilibrium viscosity is reached, the polyglycolic acid in the melt state is then spun through the orifice in a spinnerette while the polyglycolic acid is still maintaining its substantially equilibirum viscosity, without ever permitting solidification before spinning, and the spin is completed some time prior to the incipient crystallization.

The catalyst in each of the examples is recited and the alcohol is also recited along with the respective amounts of each. These examples are summarized in the table immediately hereinbelow in which the parts of catalyst, the parts of alcohol, the temperature, the equilibrium viscosity in poises, the melt temperature, the time required to reach the equilibrium viscosity and the time at which incipient crystallization occurs in the supercooled melt is set forth.

TABLE I

| Example | Type of Catalyst | Parts of Catalyst | Type of Alcohol | Parts of Alcohol | Temperature | Equil. Viscosity (poises) | Time to Reach Equil. Viscosity (hours) | Time at Which Incipient Crystallization Occurs in Supercooled Melting (hours) |
|---|---|---|---|---|---|---|---|---|
| 1 | $SnCl_2 \cdot 2H_2O$ | .00065 | Lauryl | .167 | 205 | 14,000 | 1.7 | .3 |
| 2 | $SnF_2$ | .00100 | Hexyl | .310 | 215 | 2,500 | 1.2 | 2.5 |
| 3 | $SnCl_2 \cdot 2H_2O$ | .00065 | Lauryl | .567 | 215 | 2,500 | 1.5 | 2.5 |
| 4 | $SbF_3$ | .0007 | do | .567 | 215 | 2,300 | 1.5 | 2.5 |
| 5 | $SnCl_2 \cdot 2H_2O$ | .00065 | do | .167 | 220 | 11,000 | 1.5 | 5.0 |
| 6 | $SnCl_2 \cdot 2H_2O$ | .00065 | Benzyl | .190 | 220 | 7,500 | 1.0 | 5.0 |
| 7 | $SnCl_2 \cdot 2H_2O$ | .00065 | Lauryl | .567 | 220 | 2,000 | 1.5 | 5.0 |
| 8 | $SnCl_2 \cdot 2H_2O$ | .00125 | do | .100 | 220 | 35,000 | .5 | 5.0 |
| 9 | $Bi(NO_3)_3 \cdot 2H_2O$ | .00120 | do | .100 | 220 | 33,000 | .5 | 5.0 |
| 10 | $SnCl_2 \cdot 2H_2O$ | .000975 | do | .330 | 220 | 7,800 | 1.0 | 5.0 |
| 11 | $SnCl_2 \cdot 2H_2O$ | .00125 | do | .330 | 225 | 7,500 | .5 | 8.0 |
| 12 | $SnCl_2 \cdot 2H_2O$ | .00065 | Cyclohexyl | .300 | 225 | 1,900 | 1.5 | 8.0 |
| 13 | $PbO$ | .00070 | Lauryl | .567 | 225 | 1,800 | 1.5 | 8.0 |
| 14 | $SnCl_2 \cdot 2H_2O$ | .00065 | do | .567 | 225 | 1,700 | 1.5 | 8.0 |
| 15 | $SnCl_2 \cdot 2H_2O$ | .00065 | do | .167 | 225 | 9,900 | 1.5 | 8.0 |
| 16 | $SnCl_2 \cdot 2H_2O$ | .00065 | Decyl | .280 | 225 | 8,000 | .5 | 8.0 |

We claim:
1. A process for polymerizing a glycolide and spinning fibers from the polymer thus produced comprising heating a mixture of (1) a substantially pure glycolide composition, (2) from about 0.05 to 1.5 mole percent based on the moles of said glycolide composition of an alcohol free of non-benzenoid unsaturation and free of any reactive group other than an alcoholic hydroxy group, and (3) from about 0.0005% to about 0.025%, by weight, based on the weight of said glycolide composition of a polymerization catalyst for said glycolide composition, at a temperature varying between about 205° C. and 235° C. until a substantially equilibrium viscosity is reached and thereafter spinning said polyglycolic acid from the melt state while still having a substantially equilibrium viscosity and prior to incipient crystallization.

2. The process according to claim 1 in which the catalyst is $SnCl_2 \cdot 2H_2O$.

3. The process according to claim 1 in which the polymerization temperature is maintained between about 215° C. and 230° C.

4. The process according to claim 1 in which the polymerization temperature is maintained between about 222° C. and 228° C.

5. The process according to claim 1 in which the alcohol is lauryl alcohol.

6. The process according to claim 2 in which the alcohol is lauryl alcohol.

7. The process according to claim 3 in which the alcohol is lauryl alcohol and the catalyst is $SnCl_2 \cdot 2H_2O$.

8. The process according to claim 4 in which the alcohol is lauryl alcohol and the catalyst is $SnCl_2 \cdot 2H_2O$.

References Cited

UNITED STATES PATENTS

| | | |
|---|---|---|
| 2,585,427 | 2/1952 | Beck. |
| 2,676,945 | 4/1954 | Higgins. |
| 2,668,162 | 2/1954 | Lowe. |
| 3,047,524 | 6/1962 | Bowman. |
| 3,297,033 | 1/1967 | Schmitt. |

WILLIAM H. SHORT, Primary Examiner

E. NIELSEN, Assistant Examiner

U.S. Cl. X.R.

264—176